(12) United States Patent
Suzuki

(10) Patent No.: US 7,295,248 B2
(45) Date of Patent: Nov. 13, 2007

(54) EXTERNAL SYNCHRONOUS SIGNAL GENERATING CIRCUIT AND PHASE DIFFERENCE MEASURING CIRCUIT

(75) Inventor: Noriyuki Suzuki, Kanagawa-ken (JP)

(73) Assignee: Leader Electronics Corporation, Yokohama-shi, Kanagawa-ken (JP)

( * ) Notice: Subject to any disclaimer, the term of this patent is extended or adjusted under 35 U.S.C. 154(b) by 486 days.

(21) Appl. No.: 10/981,459

(22) Filed: Nov. 5, 2004

(65) Prior Publication Data
US 2005/0212963 A1    Sep. 29, 2005

(30) Foreign Application Priority Data
Mar. 26, 2004    (JP)    ............... 2004-092187

(51) Int. Cl.
*H03L 7/00* (2006.01)
*H04N 5/04* (2006.01)
*H04N 5/08* (2006.01)
*H04N 5/268* (2006.01)
*H04N 9/44* (2006.01)

(52) U.S. Cl. ............... 348/536; 348/500; 348/516; 348/521; 348/525; 348/537; 348/540; 348/542; 348/547; 348/705; 348/706

(58) Field of Classification Search ............... 348/500, 348/516, 521, 525, 536–537, 540, 542, 547, 348/705–706
See application file for complete search history.

(56) References Cited

U.S. PATENT DOCUMENTS 5,777,686 A    7/1998    Jennes et al.
6,137,537 A *  10/2000   Tsuji et al. ............... 348/554
6,211,918 B1 * 4/2001    Uwabata et al. ........... 348/458
6,493,034 B1 * 12/2002   Elberbaum ................. 348/512
6,636,269 B1 * 10/2003   Baldwin .................... 348/500
6,697,122 B2 * 2/2004    Kim ......................... 348/554
6,847,409 B2 * 1/2005    Sakai et al. ............... 348/705
6,909,468 B2 * 6/2005    Kawada et al. ............. 348/518
6,999,131 B2 * 2/2006    Kishimoto et al. ......... 348/705
2002/0041335 A1 4/2002   Taraci et al.

FOREIGN PATENT DOCUMENTS

JP    11-215447    8/1999

* cited by examiner

*Primary Examiner*—Brian P. Yenke
(74) *Attorney, Agent, or Firm*—Fish & Richardson P.C.

(57) ABSTRACT

An external synchronous signal circuit comprises: means for measuring a phase difference between the external frame synchronous signal (FRM_SYNC) and the frame synchronous signal (FRM) of the digital video signal; means for generating a signal (EXT_H) having the same period as that of the horizontal synchronous signal (HBK) of the digital video signal, the signal (EXT_H) having the measured phase difference with reference to the frame synchronous signal (FRM) of the digital video; and means for generating a signal (EXT_F) having the same period as that of the frame synchronous signal (FRM) of the digital video signal, the signal (EXT_F) having the measured phase difference with reference to the frame synchronous signal (FRM) of the digital video. The generated signals (EXT_F) and (EXT_H) are outputted as an external frame timing signal and an external horizontal timing signal of an external synchronous signal.

7 Claims, 6 Drawing Sheets

EXTERNAL SYNCHRONOUS SIGNAL GENERATING CIRCUIT AND PHASE DIFFERENCE MEASURING CIRCUIT

BACKGROUND OF THE INVENTION

The present invention relates to a circuit that generates an external synchronous signal (an external frame synchronous signal and an external horizontal synchronous signal) from an external synchronous reference signal. The external synchronous signal is used as, for example, a timing signal when the waveform of a digital video signal (HD-SDI or SD-SDI) is displayed. The present invention also relates to a circuit that measures a phase difference between the external synchronous reference signal and the digital video signal while the external synchronous signal is being generated.

FIG. 1 shows the flow of a digital video signal. As shown in FIG. 1, at a broadcasting station, multiple digital video signals from the respective video signal output devices 11 are inputted to a switcher 12. The switcher switches one of the multiple digital video signals to another. The switcher then outputs the switched digital video signal (the selected digital video signal 14). In this situation, the phase of a digital video signal 13a selected before the switching must match the phase of a digital video signal 13b selected after the switching. This is because each of the digital video signals has a switching point and because when the digital video signal 13 is switched at a point other than the switching point, a video in the digital video signal 14, outputted by the switcher, is disturbed every time the signal is switched. In short, when the phases of the multiple digital video signals 13 match, the switching points of the multiple digital video signals also match. As a result, when the switcher switches one digital video signal 13a to another digital video signal 13b, the video in the digital video signal 14, outputted by the switcher, is not disturbed.

To match the phases of multiple digital video signals with one another, it is necessary to measure the phase of each digital video signal. FIG. 2 shows an example of a system that measures the phase of each digital video signal. As shown in FIG. 2, an external reference synchronous signal 24 (an analog reference synchronous signal: a composite of a horizontal synchronous signal and a vertical synchronous signal) from an external reference synchronous generator 21 is inputted to a waveform monitor 22. In a signal processing circuit 23 of the waveform monitor, an external frame synchronous signal (an external vertical synchronous signal) is separated from the external reference synchronous signal 24.

Further, two digital video signals 13a and 13b from the respective video signal output device 11 are inputted to the waveform monitor 22. In the waveform monitor 22, one of the digital video signals 13a and 13b is connected to the signal processing circuit 23. Operations of the signal processing circuit will be described assuming that the digital video signal 13a is connected to the signal processing circuit 23. In the signal processing circuit 23, a clock (a parallel clock: PCLK) of the digital video signal 13a is reproduced from the digital video signal 13a.

The signal processing circuit 23 generates an external horizontal synchronous signal from the external frame synchronous signal and the clock of the digital video signal 13a; the external horizontal synchronous signal is phase-synchronous with the external frame synchronous signal of the external reference synchronous signal 24 and has the same period as the horizontal synchronous period of the digital video signal 13a. Such signal processing is disclosed in Patent Document 1 or 2. The external frame synchronous signal corresponds to a vertical synchronous signal for an SDTV signal shown in Patent Document 1 or 2. Further, the external horizontal synchronous signal corresponds to a trigger signal.

The waveform monitor 22 displays the waveform of the digital video signal 13a using the external frame synchronous signal and external horizontal synchronous signal instead of a frame synchronous signal (internal frame synchronous signal) and a horizontal synchronous signal (internal horizontal synchronous signal) of the digital video signal 13a. When the external synchronous signal is used in place of the internal synchronous signal, the phase difference between the external reference synchronous signal 24 and the digital video signal 13a is reflected in the display of the waveform of the digital video signal 13a. Observing the display of the waveform of the digital video signal 13a (for example, a start point of the horizontal synchronous signal of the digital video signal 13a) enables the phase of the digital video signal 13a to be measured. When the waveform of the digital video signal 13a is displayed on the waveform monitor 22, the position of a marker is adjusted so that the marker aligns with the start point of the horizontal synchronous signal of the digital video signal 13a.

Then, in place of the digital video signal 13a, the digital video signal 13b is connected to the signal processing circuit 23. As in the case of the processing of the digital video signal 13a, the waveform of the digital video signal 13b is displayed using the external frame synchronous signal and the external horizontal synchronous signal. The phase difference between the external reference synchronous signal 24 and the digital video signal 13b is reflected in the display of the waveform of the digital video signal 13b. Observing the display of the waveform of the digital video signal 13b (for example, a start point of the horizontal synchronous signal of the digital video signal 13b) enables the phase of the digital video signal 13b to be measured. Then, by observing the start point of the horizontal synchronous signal of the digital video signal 13b and a marker coinciding with the start point of the horizontal synchronous signal of the digital video signal 13a, the relative phase difference between the digital video signals 13a and 13b are measured.

In this situation, the phase of the digital video signal 13b can be adjusted using a phase adjuster (not shown; for example, a phase adjusting circuit inside the video signal output device 11 or a phase adjuster connected between the video signal output device 11 and the waveform monitor 22). The phases of multiple digital video signals (13a and 13b) can be matched with each other by adjusting the phase of the digital video signal 13b while viewing the waveform monitor 22.

[Patent Document 1] Japanese Patent Laid-Open No. 11-215447

[Patent Document 2] U.S. Pat. Document No. 6,130,708

SUMMARY OF THE INVENTION

It is an object of the present invention to provide a circuit that easily measures the phase difference between an external synchronous reference signal and a digital video signal.

It is another object of the present invention to provide a circuit that generates an external synchronous signal (an external frame synchronous signal and an external horizontal synchronous signal) utilizing the phase difference between the external synchronous reference signal and the digital video signal. In other words, it is another object of the present invention to provide a new technique to generate an external horizontal synchronous signal, and to provide a technique to generate an external frame synchronous signal again.

Other objects of the present invention will be apparent to those skilled in the art with reference to the claims, the detailed description of the invention, and the drawings.

A circuit that generates an external synchronous signal according to the present invention comprises: means for inputting an external frame synchronous signal (FRM_SYNC) as well as a frame synchronous signal (FRM) and a horizontal synchronous signal (HBK) of a digital video signal; means for measuring a phase difference between the external frame synchronous signal (FRM_SYNC) and the frame synchronous signal (FRM) of the digital video signal; means for generating a signal (EXT_H) having the same period as that of the horizontal synchronous signal (HBK) of the digital video signal, the signal (EXT_H) having the measured phase difference with reference to the frame synchronous signal (FRM) of the digital video; and means for generating a signal (EXT_F) having the same period as that of the frame synchronous signal (FRM) of the digital video signal, the signal (EXT_F) having the measured phase difference with reference to the frame synchronous signal (FRM) of the digital video. The generated signals (EXT_F) and (EXT_H) are outputted as an external frame timing signal and an external horizontal timing signal of the external synchronous signal.

Specifically, the circuit that generates the external synchronous signal comprises: means (4) for generating a pulse signal (FRM_SYNC_PS) that is phase-synchronous with an external frame synchronous signal (FRM_SYNC); means (1) for generating a pulse signal (FRM_PS) that is phase-synchronous with a frame synchronous signal (FRM) of a digital video signal; means (5) for generating a pulse signal (HBK_PS) that is phase-synchronous with a horizontal synchronous signal (HBK) of the digital video signal; means (6,7) for measuring a number of lines by which a phase of the pulse signal (FRM_SYNC_PS) of the external frame synchronous signal is separated from a phase of the pulse signal (FRM_PS) of the frame synchronous signal of the digital video signal in terms of a period of the horizontal synchronous signal (HBK) of the digital video signal; means (2,3) for measuring a number of dots by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal; means (9) for generating a signal (EXT_H_A) that is phase-shifted with respect to the phase of the pulse signal (FRM_PS) of the frame synchronous signal of the digital video signal on the basis of the measured number of dots, the signal (EXT_H_A) having the same period as that of the horizontal synchronous signal (HBK) of the digital video signal; means (8) for generating a signal (EXT_F_A) that is phase-shifted with respect to the phase of the pulse signal (FRM_PS) of the frame synchronous signal of the digital video signal on the basis of the measured number of lines, the signal (EXT_F_A) having the same period as that of the frame synchronous signal (FRM) of the digital video signal; means (10) for phase-shifting the signal (EXT_F_A) generated by the means (8) on the basis of the measured number of dots; and means (11) for phase-shifting the signal (EXT_H_A) generated by the means (9) so that a phase of the signal (EXT_F) phase-shifted by the means (10) matches a phase of the signal (EXT_H_A) generated by the means (9).

A circuit that measures a phase difference according to the present invention comprises: means (4) for generating a pulse signal (FRM_SYNC_PS) that is phase-synchronous with an external frame synchronous signal (FRM_SYNC); means (1) for generating a pulse signal (FRM_PS) that is phase-synchronous with a frame synchronous signal (FRM) of a digital video signal; means (5) for generating a pulse signal (HBK_PS) that is phase-synchronous with a horizontal synchronous signal (HBK) of the digital video signal; means (6,7) for measuring a number of lines by which a phase of the pulse signal (FRM_SYNC_PS) of the external frame synchronous signal is separated from a phase of the pulse signal (FRM_PS) of the frame synchronous signal of the digital video signal in terms of a period of the horizontal synchronous signal (HBK) of the digital video signal; and means (2,3) for measuring a number of dots by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal.

A waveform monitor according to the present invention comprises the circuit that measures the phase difference, and memory means for storing the measured number of lines and the measured number of dots. The stored number of lines and the measured number of dots are displayed on the waveform monitor.

The waveform monitor further comprises a CPU that calculates a difference between the number of lines and the number of dots of a digital video signal inputted as a first input, and the number of lines and the number of dots for another digital video signal inputted as a second input. The calculated difference is displayed on the waveform monitor as a relative phase difference between the digital video signal as the first input and the digital video signal as the second input.

DETAILED DESCRIPTION OF THE INVENTION

Figure 1:
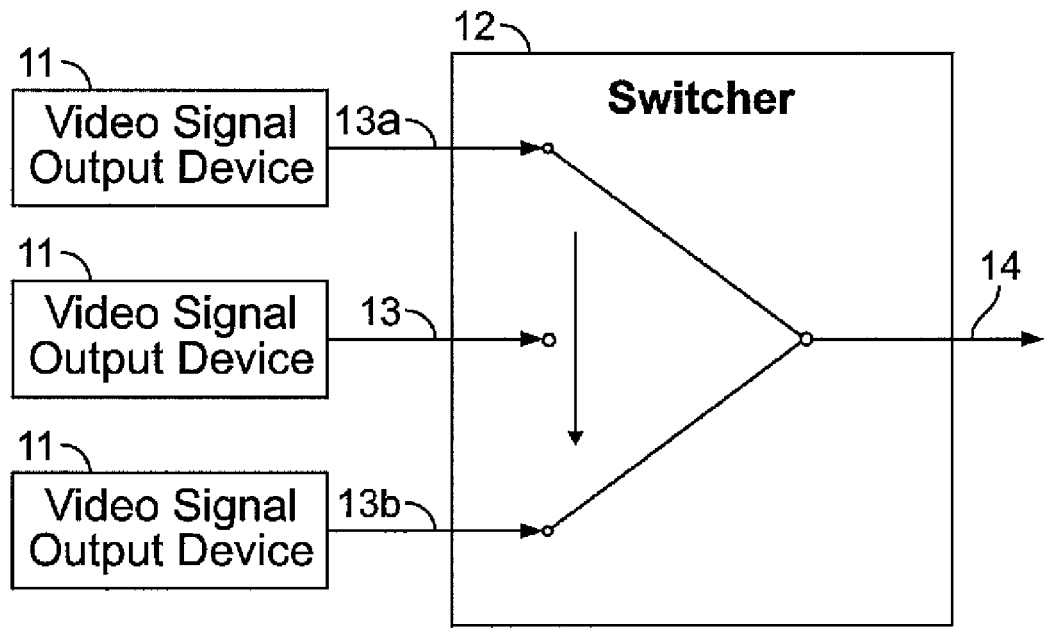
FIG. 1 is a diagram showing the flow of digital video signals.
Figure 2:
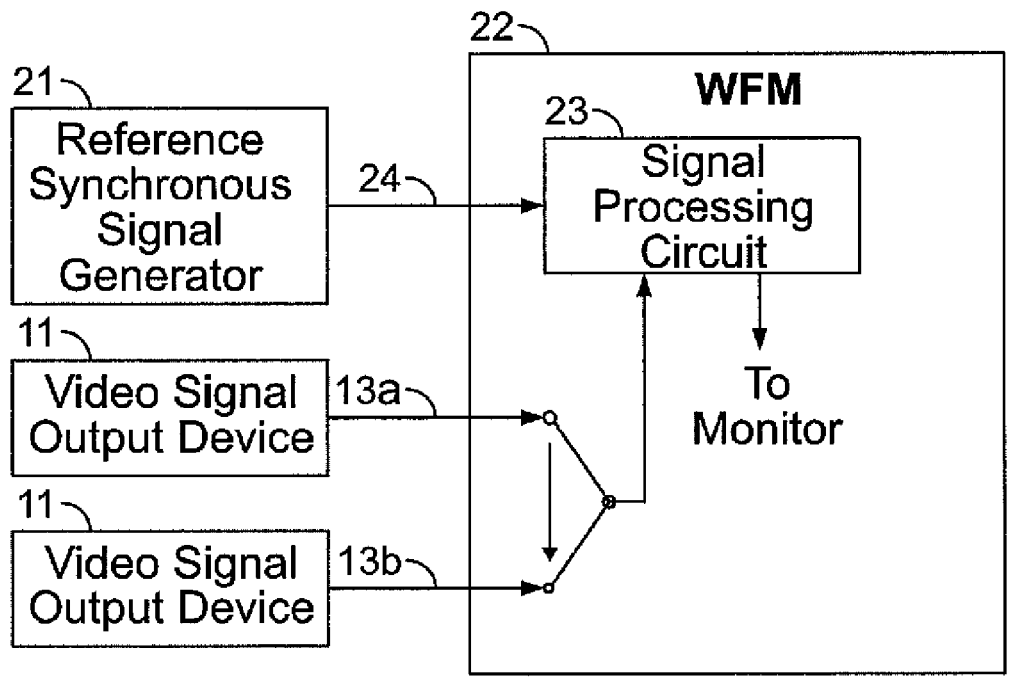
FIG. 2 is a diagram showing an example of a system that measures the phase of each digital video signal.
Figure 3:
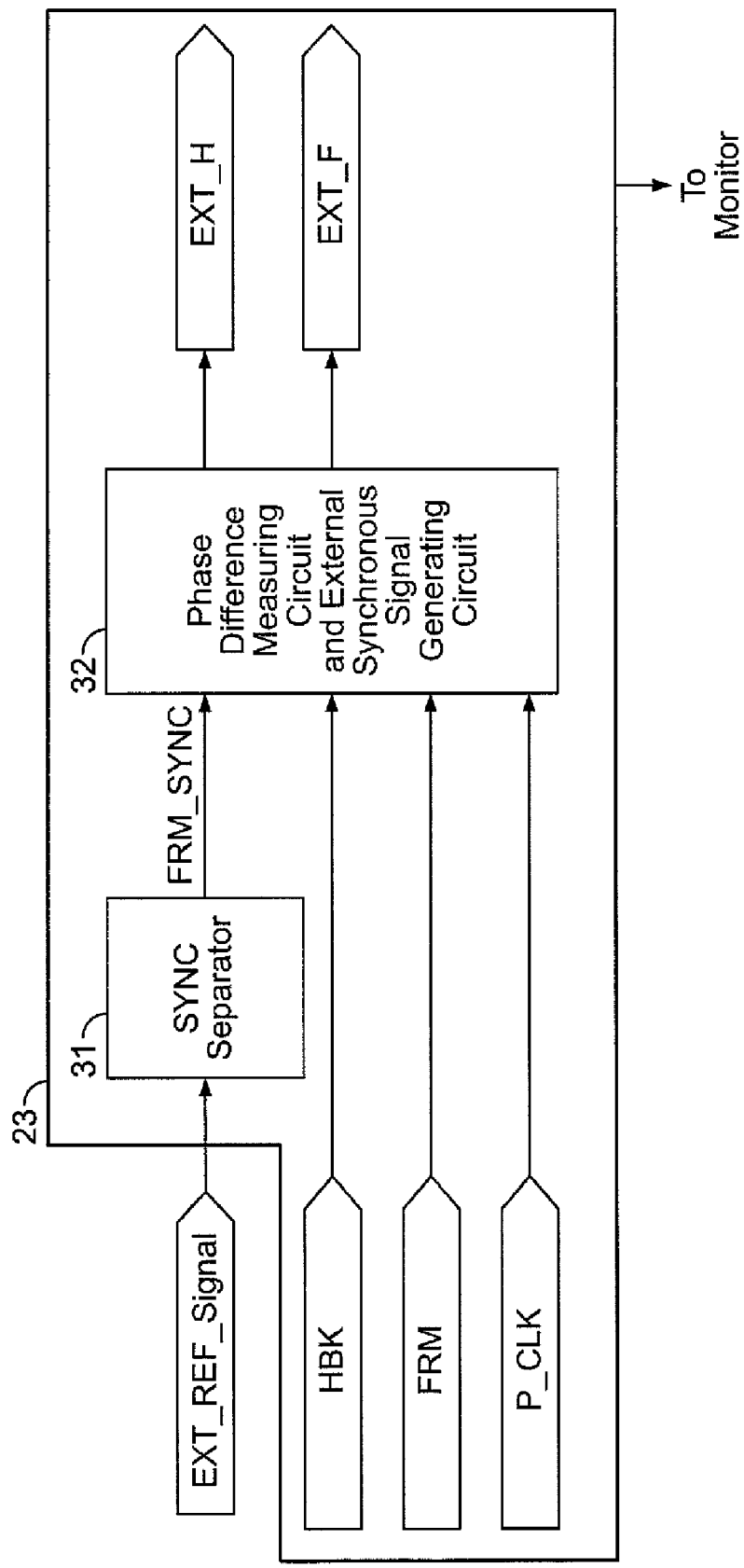
FIG. 3 is a schematic block diagram of a part of signal processing circuit for a waveform monitor, which circuit comprises an external synchronous signal generating circuit and phase difference measuring circuit according to the present invention.

FIG. 3 is a schematic block diagram of a part of a signal processing circuit for a waveform monitor, which circuit comprises an external synchronous signal generating circuit and a phase difference measuring circuit according to the present invention. With reference to FIGS. 2 and 3, the external reference synchronous signal 24 (EXT_REF_SIGNAL) is inputted to a sync separator 31 of the signal processing circuit 23. The sync separator separates an external frame synchronous signal (FRM_SYNC) from the external reference synchronous signal 24 (EXT_REF_SIGNAL).

In the signal processing circuit 23, a clock (PCLK) is reproduced from a digital video signal. A horizontal synchronous signal (HBK) and a frame synchronous signal (FRM) of the digital video signal 13 are generated from the clock (PCLK) and the digital video signal.

The external frame synchronous signal (FRM_SYNC) as well as the horizontal synchronous signal (HBK), frame synchronous signal (FRM), and clock (PCLK) of the digital video signal are inputted to an external synchronous signal generating circuit and phase difference measuring circuit 32 according to the present invention. The phase difference measuring circuit measures the phase difference between the external frame synchronous signal (FRM_SYNC) and the frame synchronous signal (FRM) of the digital video signal, that is, the phase difference between the external reference synchronous signal (EXT_REF_SIGNAL) and the frame synchronous signal (FRM) of the digital video signal. Further, the external synchronous signal generating circuit generates an external horizontal timing signal (EXT_H) and an external frame timing signal (EXT_F) that are phase-synchronous with the external frame synchronous signal (or external synchronous reference signal). The waveform monitor uses the external horizontal timing signal (EXT_H) and external frame timing signal (EXT_F) to display the waveform of the digital video signal.

Figure 4:
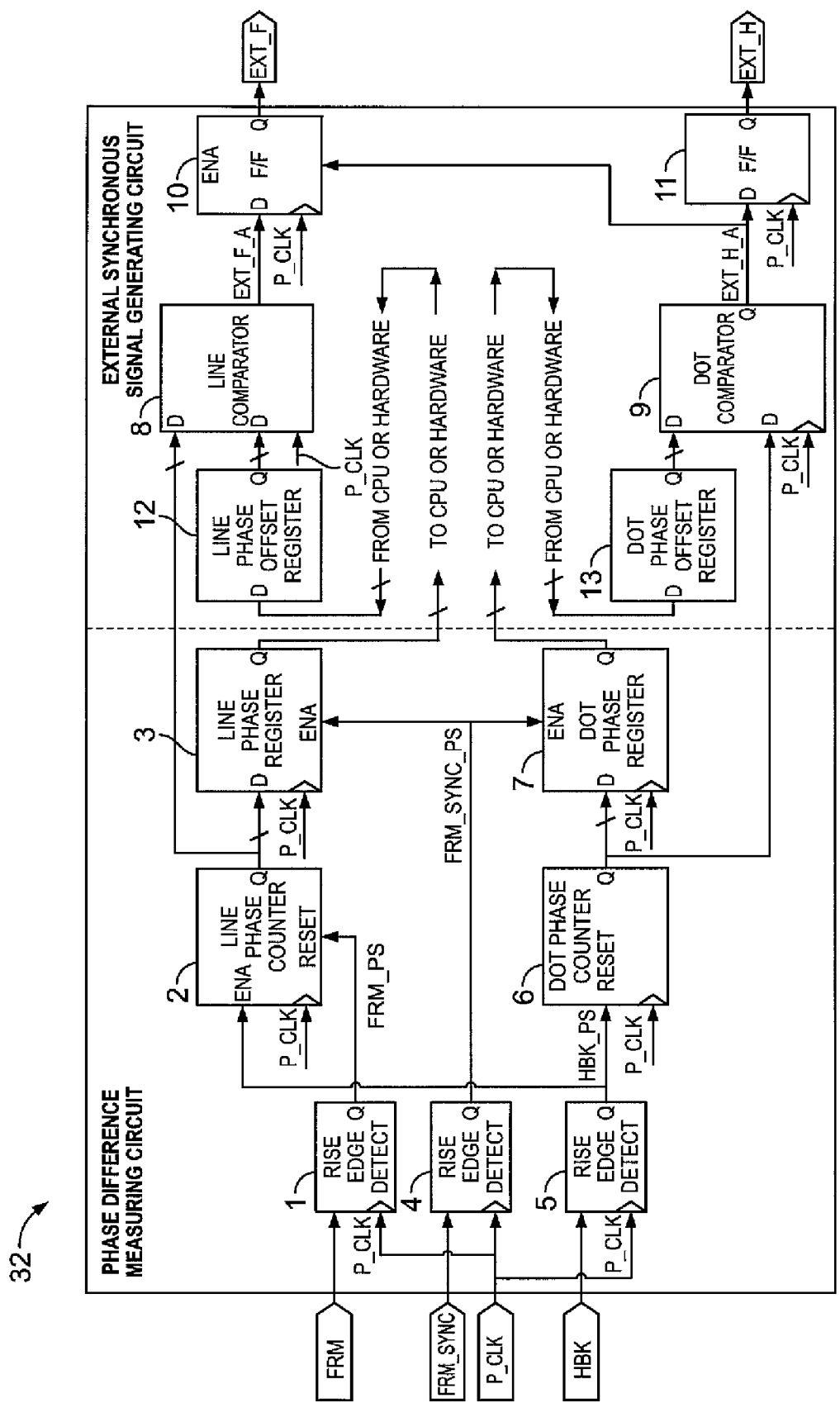
FIG. 4 is a specific block diagram of the external synchronous signal generating circuit and phase difference measuring circuit according to the present invention.
Figure 5:
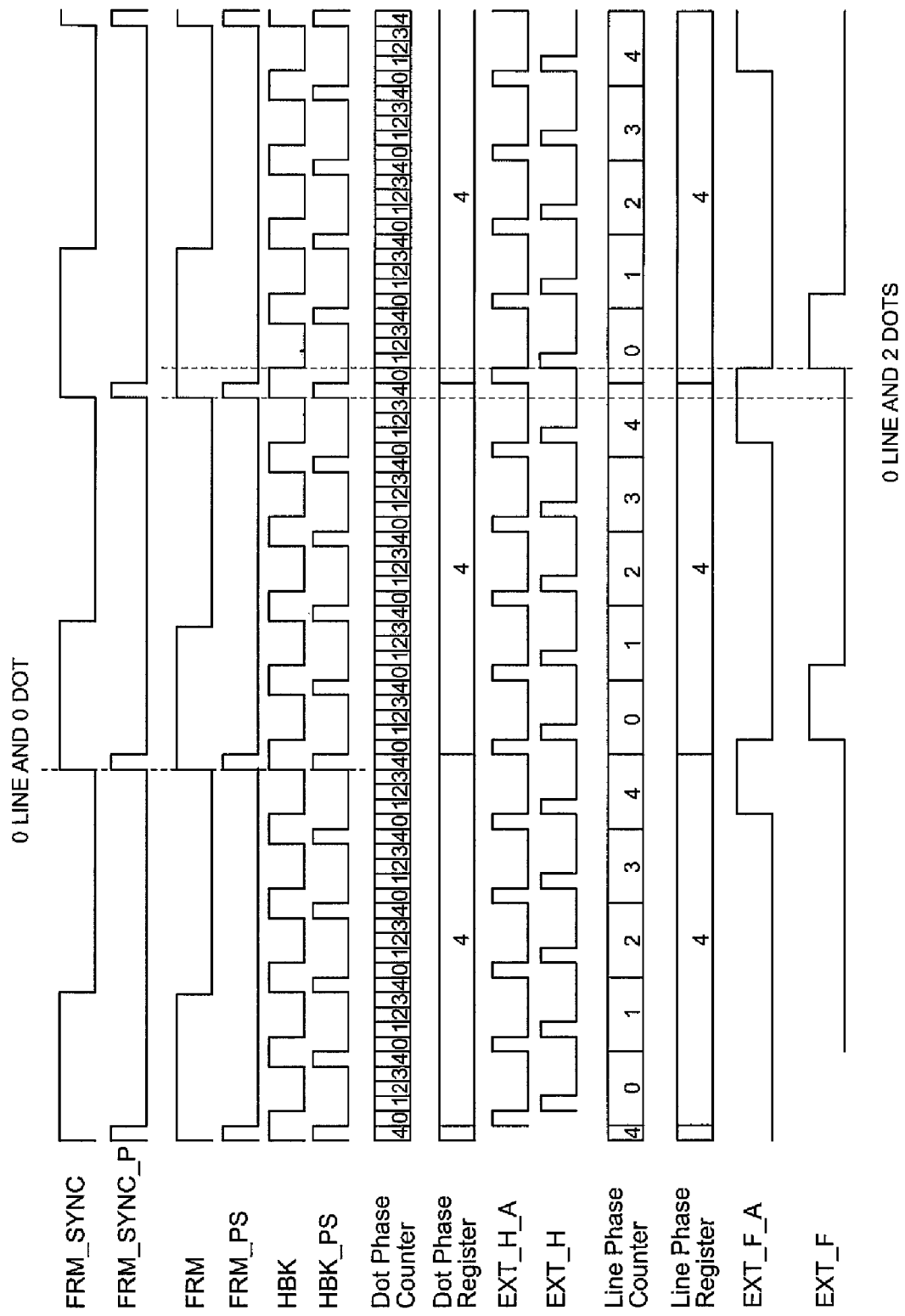
FIG. 5 is an example of a timing chart of signals processed or generated in the external synchronous signal generating circuit and phase difference measuring circuit according to the present invention.

FIG. 4 is a block diagram specifically showing the external synchronous signal generating circuit and phase difference measuring circuit according to the present invention. FIG. 5 is an example of a timing chart of signals processed or generated in the external synchronous signal generating circuit and phase difference measuring circuit according to the present invention.

For simplification of the timing chart, in FIG. 5, the period of the external frame synchronous signal (FRM_SYNC) is the same as that of the frame synchronous signal (FRM) of the digital video signal and is 25 times as large as that of the clock (PCLK) (that is, 25 clocks). The period of the horizontal synchronous signal (HBK) of the digital video signal is five times as large as that of the clock (PCLK) of the digital video signal (that is, 5 clocks). The phase of the external frame synchronous signal (FRM_SYNC) matches the phase of the frame synchronous signal (FRM) of the digital video signal.

(Phase Difference Measuring Circuit)

The phase difference measuring circuit comprises means (4) for generating a pulse signal (FRM_SYNC_PS) which is phase-synchronous with the external frame synchronous signal (FRM_SYNC) and which has a pulse width equal to one clock period of the digital video signal. Specifically, the means (4) for generating the pulse signal (FRM_SYNC_PS) which is phase-synchronous with the external frame synchronous signal (FRM_SYNC) is a rise detecting circuit (RISE EDGE DETECT). The external frame synchronous signal (FRM_SYNC) and the clock (PCLK) of the digital video signal are inputted to the rise detecting circuit. The rise detecting circuit outputs the pulse signal (FRM_SYNC_PS) whenever a rise in the external frame synchronous signal (FRM_SYNC) is detected (see FIG. 5).

The phase difference measuring circuit comprises means (1) for generating a pulse signal (FRM_PS) which is phase-synchronous with the frame synchronous signal (FRM) of the digital video signal and which has a pulse width equal to one clock period of the digital video signal. Specifically, the means (1) for generating the pulse signal (FRM_PS) which is phase-synchronous with the frame synchronous signal (FRM) of the digital video signal is a rise detecting circuit (RISE EDGE DETECT). The frame synchronous signal (FRM) of the digital video signal and the clock (PCLK) of the digital video signal are inputted to the rise detecting circuit. The rise detecting circuit outputs the pulse signal (FRM_PS) whenever a rise in the frame synchronous signal (FRM) of the digital video signal is detected (see FIG. 5).

The phase difference measuring circuit comprises means (5) for generating a pulse signal (HBK_PS) which is phase-synchronous with the horizontal synchronous signal (HBK) of the digital video signal and which has a pulse width equal to one clock period of the digital video signal. Specifically, the means (5) for generating the pulse signal (HBK_PS) which is phase-synchronous with the horizontal synchronous signal (HBK) of the digital video signal is a rise detecting circuit (RISE EDGE DETECT). The horizontal synchronous signal (HBK) of the digital video signal and the clock (PCLK) of the digital video signal are inputted to the rise detecting circuit. The rise detecting circuit outputs the pulse signal (HBK_PS) whenever a rise in the horizontal synchronous signal (HBK) of the digital video signal is detected (see FIG. 5).

The phase difference measuring circuit further comprises means (6), (7), (2), and (3) for measuring the phase difference between the pulse signal (FRM_SYNC_PS) of the external frame synchronous signal and the pulse signal (FRM_PS) of the frame synchronous signal of the digital video signal. Specifically, the means (6), (7), (2), and (3) for measuring the phase difference measure how far the phase of the pulse signal (FRM_SYNC_PS) of the external frame synchronous signal is separated from the phase of the pulse signal (FRM_PS) of the frame synchronous signal of the digital video signal in terms of a period of the horizontal synchronous signal (HBK) of the digital video signal, that is, the number of lines and dots by which these phases are separated from each other. That is, the means (6), (7), (2), and (3) for measuring the phase difference measures the number of lines (2,3) and the number of dots (6,7) by which the phase of the pulse signal (FRM_SYNC_PS) of the external frame synchronous signal is separated from the phase of the pulse signal (FRM_PS) of the frame synchronous signal of the digital video signal.

More specifically, the means (6), (7), (2), and (3) for measuring the phase difference comprises a dot phase difference counter (DOT PHASE COUNTER), a dot phase difference register (DOT PHASE REGISTER), a line phase difference counter (LINE PHASE COUNTER), and a line phase difference register (LINE PHASE REGISTER).

The pulse signal (HBK_PS) of the horizontal synchronous signal of the digital video signal is inputted to the dot phase difference counter (DOT PHASE COUNTER) as a reset signal. The clock (PCLK) of the digital video signal is also inputted to the dot phase difference counter (DOT PHASE COUNTER), which counts the clock and outputs the counter value to the dot phase difference register (DOT PHASE REGISTER). In the example in FIG. 5, when one clock (or dot) has elapsed after the pulse signal (HBK_PS) of the horizontal synchronous signal of the digital video signal has been inputted to the dot phase difference counter (DOT PHASE COUNTER), the dot phase difference counter resets the counter value to "0". After one clock or dot has further elapsed, the dot phase difference counter increments the counter value to "1". After one clock or dot has further elapsed, the dot phase difference counter increments the counter value to "2". After one clock or dot has further elapsed, the dot phase difference counter increments the counter value to "3". After one clock or dot has further elapsed, the pulse signal (HBK_PS) of the horizontal synchronous signal of the digital video signal is inputted to the dot phase difference counter. The dot phase difference counter then increments the counter value to "4". Then, when one clock or dot has elapsed after the pulse signal (HBK_PS) of the horizontal synchronous signal of the digital video signal has been inputted to the dot phase difference counter, the dot phase difference counter resets the counter value to "0".

The clock (PCLK) of the digital video signal is inputted to the dot phase difference register (DOT PHASE REGISTER) as an operation clock. The pulse signal (FRM_SYNC_PS) of the external frame synchronous signal is also inputted to the dot phase difference register (DOT PHASE REGISTER) as an enable signal. The counter value from the dot phase difference counter is also inputted to the dot phase difference register (DOT PHASE REGISTER). The dot phase difference register holds and outputs the counter value when the pulse signal of the external frame synchronous signal is inputted. In the example shown in FIG. 5, when the pulse signal of the external frame synchronous signal is inputted to the dot phase difference register, the dot phase difference counter shows a counter value of "4". Accordingly, the dot phase difference register holds the counter value "4".

As described above, the counter value held by the dot phase difference register indicates the number of dots by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal. In the example shown in FIG. 5, the counter value "4" held by the dot phase difference register means that the phase of the pulse signal (FRM_SYNC_PS) of the external frame synchronous signal is separated from the phase of the pulse signal (FRM_PS) of the frame synchronous signal of the digital video signal by a "0" dot. Note that, if the counter value held by the dot phase difference register indicates "0", "1", "2", or "3", it means that the phases are separated from each other by "1", "2", "3", or "4" dots.

The pulse signal (FRM_PS) of the frame synchronous signal of the digital video signal is inputted to the line phase difference counter (LINE PHASE COUNTER) as a reset signal. The pulse signal (HBK_PS) of the horizontal synchronous signal of the digital video signal is also inputted to the line phase difference counter (LINE PHASE COUNTER) as an enable signal. The clock (PCLK) of the digital video signal is also inputted to the line phase difference counter (LINE PHASE COUNTER) as an operation clock. The line phase difference counter (LINE PHASE COUNTER) counts the pulse signal (HBK_PS) of the horizontal synchronous signal of the digital video signal and outputs the counter value to the line phase difference register (LINE PHASE REGISTER). In the example in FIG. 5, when one clock or dot has elapsed after the pulse signal (FRM_PS) of the frame synchronous signal of the digital video signal and the pulse signal (HBK_PS) of the horizontal synchronous signal of the digital video signal have been inputted to the line phase difference counter (LINE PHASE COUNTER), the line phase difference counter resets the counter value to "0". When one clock or dot has elapsed after the pulse signal (HBK_PS) of the horizontal synchronous signal of the digital video signal has been inputted subsequently, the line phase difference counter increments the counter value to "1". When one clock or dot has elapsed after the pulse signal (HBK_PS) of the horizontal synchronous signal of the digital video signal has been further inputted, the line phase difference counter increments the counter value to "2". When one clock or dot has elapsed after the pulse signal (HBK_PS) of the horizontal synchronous signal of the digital video signal has been further inputted, the line phase difference counter increments the counter value to "3". When one clock or dot has elapsed after the pulse signal (HBK_PS) of the horizontal synchronous signal of the digital video signal has been further inputted, the line phase difference counter increments the counter value to "4". Subsequently, when one clock or dot has elapsed after the pulse signal (FRM_PS) of the frame synchronous signal of the digital video signal and the pulse signal (HBK_PS) of the horizontal synchronous signal of the digital video signal have been further inputted, the line phase difference counter resets the counter value to "0".

The clock (PCLK) of the digital video signal is inputted to the line phase difference register (LINE PHASE REGISTER) as an operation clock. The pulse signal (FRM_SYNC_PS) of the external frame synchronous signal is also inputted to the line phase difference register (LINE PHASE REGISTER) as an enable signal. The counter value from the line phase difference counter is also inputted to the line phase difference register (LINE PHASE REGISTER). The line phase difference register holds and outputs the counter value when the pulse signal of the external frame synchronous signal is inputted. In the example shown in FIG. 5, when the pulse signal of the external frame synchronous signal is inputted to the dot phase difference register, the line phase difference counter shows a counter value of "4". Accordingly, the line phase difference register holds the counter value "4".

As described above, the counter value held by the line phase difference register means that the number of lines by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal. In the example shown in FIG. 5, the counter value "4" held by the line phase difference register means that the phase of the pulse signal (FRM_SYNC_PS) of the external frame synchronous signal is separated from the phase of the pulse signal (FRM_PS) of the frame synchronous signal of the digital video signal by a "0" line. Note that, if the counter value held by the dot phase difference register indicates "4" and the counter value held by the line phase difference register indicates "0", "1", "2", or "3", it means that the phases are separated from each other by "1", "2", "3", or "4" lines, respectively. (Note that, if the counter value held by the dot phase difference register does not indicate "4" and the counter value held by the line phase difference register indicates "0", "1", "2", "3", or "4", it means that the phases are separated from each other by "0", "1", "2", "3", or "4" lines, respectively. See FIG. 6 and its description).

(External Synchronous Signal Generating Circuit)

For simplification of description of the external synchronous signal generating circuit, the following means are omitted: means (13) for adjusting the counter value held by the dot phase difference register and means (12) for adjusting the counter value held by the line phase difference register.

The external synchronous signal generating circuit comprises means (9) for generating a signal (EXT_H_A) having the same period as that of the horizontal synchronous signal (HBK) of the digital video signal and being phase-shifted with respect to the phase of the pulse signal (FRM_PS) of the frame synchronous signal of the digital video signal on the basis of the number of dots by which the phase of the pulse signal (FRM_SYNC_PS) of the external frame synchronous signal is separated from the phase of the pulse signal (FRM_PS) of the frame synchronous signal of the digital video signal. Specifically, the means (9) for generating the signal (EXT_H_A) having the same period as that of the horizontal synchronous signal (HBK) of the digital video signal is a comparator (DOT COMPARATOR) that outputs the signal (EXT_H_A) indicating a HIGH status when the counter value counted by the dot phase difference counter matches the counter value held by the dot phase difference register. More specifically, the counter value counted by the dot phase difference counter and the counter value held by the dot phase difference register are inputted to the comparator (DOT COMPARATOR). The clock (PCLK) of the digital video signal is also inputted to the comparator (DOT COMPARATOR) as an operation clock. The comparator (DOT COMPARATOR) outputs a signal indicating a HIGH status only while the counter value counted by the dot phase difference counter matches the counter value held by the dot phase difference register. The comparator (DOT COMPARATOR) outputs a signal indicating a LOW status during the remaining period. In the example shown in FIG. 5, when one clock or dot has elapsed after the counter value "4" in the dot phase difference counter (DOT PHASE COUNTER) has become equal to the counter value "4" in the dot phase difference register (DOT PHASE REGISTER), the signal (EXT_H_A) indicating the HIGH status is generated while the counter value "4" is counted (one clock).

Further, the external synchronous signal generating circuit comprises means (8) for generating a signal (EXT_F_A) having the same period as that of the frame synchronous signal (FRM) of the digital video signal and being phase-shifted with respect to the phase of the pulse signal (FRM_PS) of the frame synchronous signal of the digital video signal on the basis of the number of lines by which the phase of the pulse signal (FRM_SYNC_PS) of the external frame synchronous signal is separated from the phase of the pulse signal (FRM_PS) of the frame synchronous signal of the digital video signal. Specifically, the means (8) for generating the signal (EXT_F_A) having the same period as that of the frame synchronous signal (FRM) of the digital video signal is a comparator (LINE COMPARATOR) that outputs the signal (EXT_F_A) indicating the HIGH status when the counter value counted by the line phase difference counter matches the counter value held by the line phase difference register. More specifically, the counter value counted by the line phase difference counter and the counter value held by the line phase difference register are inputted to the comparator (LINE COMPARATOR). The clock (PCLK) of the digital video signal is also inputted to the comparator (LINE COMPARATOR) as an operation clock. The comparator (LINE COMPARATOR) outputs a signal indicating a HIGH status only while the counter value counted by the line phase difference counter matches the counter value held by the line phase difference register. The comparator (LINE COMPARATOR) outputs the signal indicating a LOW status during the remaining period. In the example shown in FIG. 5, when one clock or dot has elapsed after the counter value "4" in the line phase difference counter (LINE PHASE COUNTER) has become equal to the counter value "4" in the line phase difference register (LINE PHASE REGISTER), the signal (EXT_F_A) indicating the HIGH status is generated while the counter value "4" is counted (five clocks).

Note that the phase difference between the pulse signal (FRM_SYNC_PS) of the external frame synchronous signal and the pulse signal (FRM_PS) of the frame synchronous signal of the digital video signal is not completely reflected in the signal (EXT_F_A) having the same period as that of the frame synchronous signal (FRM) of the digital video signal. That is, only the following is reflected in the signal (EXT_F_A) having the same period as that of the frame synchronous signal (FRM) of the digital video signal: the number of lines by which the phase of the pulse signal (FRM_SYNC_PS) of the external frame synchronous signal is separated from the phase of the pulse signal (FRM_PS) of the frame synchronous signal of the digital video signal.

Accordingly, the external synchronous signal generating circuit comprises means (10) for phase-shifting the signal (EXT_F_A) having the same period as that of the frame synchronous signal (FRM) of the digital video signal, on the basis of the number of dots by which the phase of the pulse signal (FRM_SYNC_PS) of the external frame synchronous signal is separated from the phase of the pulse signal (FRM_PS) of the frame synchronous signal of the digital video signal. Specifically, a flip flop (F/F) constitutes the means (10) for phase-shifting the signal (EXT_F_A) having the same period as that of the frame synchronous signal (FRM) of the digital video signal. More specifically, the signal (EXT_F_A) from the comparator (LINE COMPARATOR) is inputted to the flip flop (F/F). The clock (PCLK) of the digital video signal is also inputted to the flip flop (F/F) as an operation clock. The signal (EXT_H_A) from the comparator (DOT COMPARATOR) is also inputted to the flip flop (F/F) as an enable signal. The flip flop (F/F) latches the signal (EXT_F_A) from the comparator (LINE COMPARATOR) temporally in accordance with the signal (EXT_H_A) from the comparator (DOT COMPARATOR).

The following is reflected in the external frame timing signal (EXT_F) outputted by the means (10) for phase-shifting the signal (EXT_F_A) having the same period as that of the frame synchronous signal (FRM) of the digital video signal: the number of lines and the number of dots by which the phase of the pulse signal (FRM_SYNC_PS) of the external frame synchronous signal is separated from the phase of the pulse signal (FRM_PS) of the frame synchronous signal of the digital video signal. In the example shown in FIG. 5, the external frame timing signal (EXT_F) has a phase difference of 0 line and 2 dots (a phase difference of 0 line and 0 dot and a phase difference of 2 dots) with respect to the pulse signal (FRM_SYNC_PS) of the external frame synchronous signal. The phase difference of 0 line and 0 dot is observed between the pulse signal (FRM_SYNC_PS) of the external frame synchronous signal and the pulse signal (FRM_PS) of the frame synchronous signal of the digital video signal. The phase difference of 2 dots corresponds to a delay of 1 clock or dot caused by the comparator (LINE COMPARATOR) or a delay of 1 clock or dot caused by the flip flop (F/F).

Note that the phase of the external frame timing signal (EXT_F) must be matched with the phase of the signal (EXT_H_A) outputted by the means (9) for generating the signal (EXT_H_A) having the same period as that of the horizontal synchronous signal (HBK) of the digital video signal. In other words, the signal (EXT_H_A) needs to have a phase delay of 1 clock or dot.

Accordingly, the external synchronous signal generating circuit comprises means (11) for phase-shifting the signal (EXT_H_A) having the same period as that of the horizontal synchronous signal (HBK) of the digital video signal. Specifically, a flip flop (F/F) constitutes the means (11) for phase-shifting the signal (EXT_H_A) having the same period as that of the horizontal synchronous signal (HBK) of the digital video signal. More specifically, the signal (EXT_H_A) from the comparator (DOT COMPARATOR) is inputted to the flip flop (F/F). The clock (PCLK) of the digital video signal is also inputted to the flip flop (F/F) as an operation clock. The flip flop (F/F) phase-shifts the signal (EXT_F_A) from the comparator (DOT COMPARATOR) by an amount equal to the phase of one clock or dot. The flip flop (F/F) then outputs the phase-shifted signal as an external horizontal timing signal (EXT_H).

As described above, the external frame timing signal (EXT_F) and the external horizontal timing signal (EXT_H) have a phase difference of 2 dots from the pulse signal (FRM_SYNC_PS) of the external frame synchronous signal, the phase difference being caused by a delay in the external synchronous signal generating circuit.

Accordingly, the external synchronous signal generating circuit may comprise means (12) and (13) for phase-shifting the external frame timing signal (EXT_F) and the external horizontal timing signal (EXT_H). Specifically, the means (13) for phase-shifting the external frame timing signal (EXT_F) and the external horizontal timing signal (EXT_H) in order to eliminate the phase difference of 2 dots resulting from the delay in the external synchronous signal generating circuit, is the means (13) adjusting the counter value held by the dot phase difference register (7) and delivering the value to the comparator (DOT COMPARATOR). The means (13) is composed of a CPU or hardware. The 2 dots resulting from the delay in the external synchronous signal generating circuit are subtracted from the counter value held by the dot phase difference register (7). The resulting value is then outputted to the comparator (DOT COMPARATOR). With reference to the example shown in FIG. 5, those skilled in the art can easily appreciate that the signal (EXT_H_A) outputted by the comparator (DOT COMPARATOR) is moved ahead by an amount equal to the phase difference of 2 dots compared to the case in which the external synchronous signal generating circuit does not comprise the means (13) for adjusting the counter value held by the dot phase difference register (7). As a result, it should be easily appreciated that the external synchronous signal generating circuit moves both external frame timing signal (EXT_F) and external horizontal timing signal (EXT_H) forward by a phase difference of 2 dots.

If the external frame timing signal (EXT_F) and external horizontal timing signal (EXT_H) have a phase difference caused by a factor other than a delay in the external synchronous signal generating circuit (a system-wide phase difference) with respect to the pulse signal (FRM_SYNC_PS) of the external frame synchronous signal, the counter value held by the dot phase difference register (7) is adjusted so as to eliminate the phase difference. Further, when the phase difference (system-wide phase difference) has not only a phase difference in dots but also a phase difference in lines, the external synchronous signal generating circuit may comprise the means (12) for adjusting the counter value held by the line phase difference register (3) and delivering the adjusted value to the comparator (LINE COMPARATOR). The means (12) is composed of a CPU or hardware.

Figure 6:
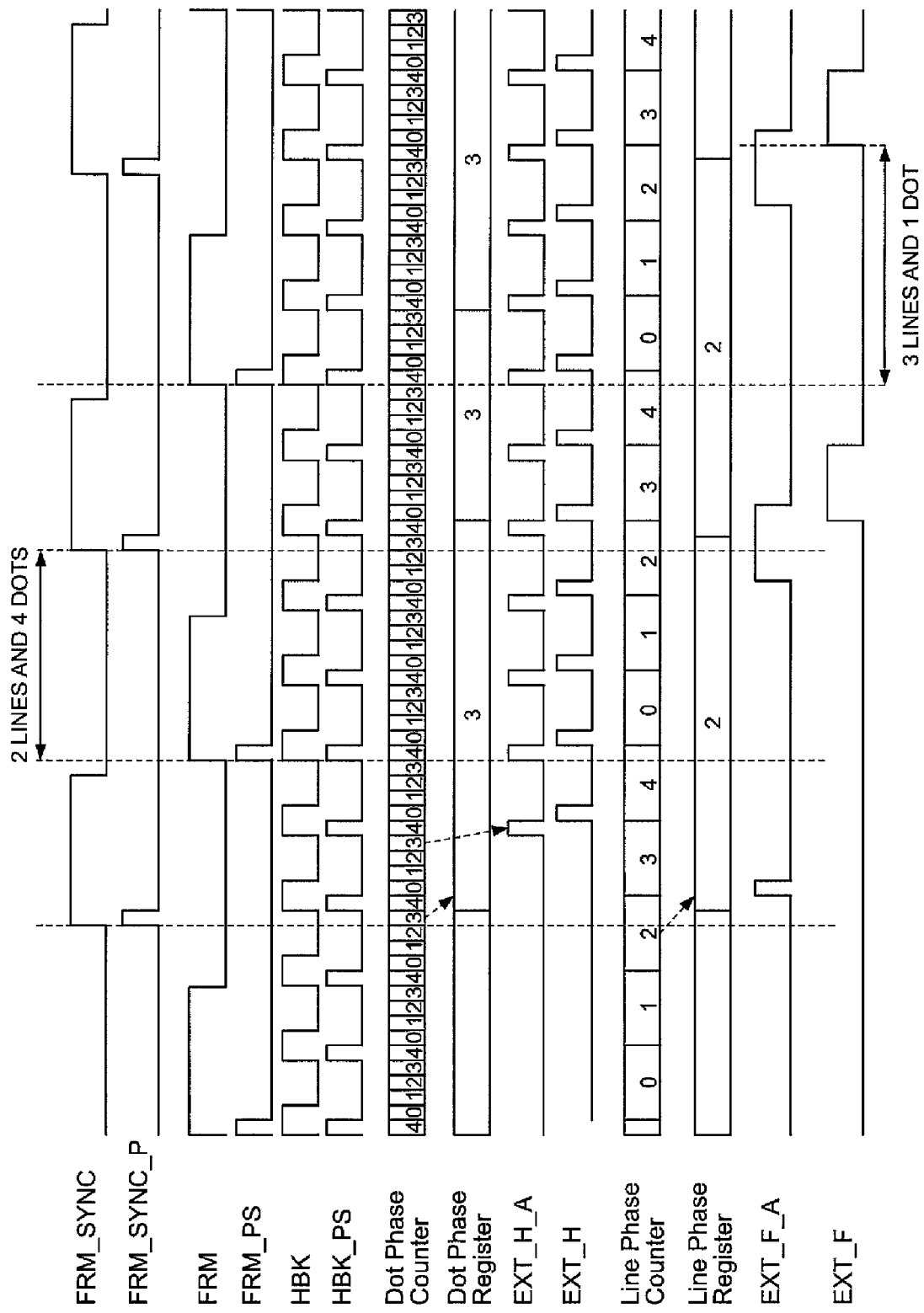
FIG. 6 is another example of a timing chart of signals processed or generated in the external synchronous signal generating circuit and phase difference measuring circuit according to the present invention.

FIG. 6 shows another example of a timing chart of signals processed or generated in the external synchronous signal generating circuit and phase difference measuring circuit according to the present invention. For simplification of the timing chart, in FIG. 6, as in FIG. 5, the period of the external frame synchronous signal (FRM_SYNC) is the same as that of the frame synchronous signal (FRM) of the digital video signal and is 25 times as large as that of the clock (PCLK) of the digital video signal (that is, 25 clocks). Further, the period of the horizontal synchronous signal (HBK) of the digital video signal is 5 times as large as that of the clock (PCLK) of the digital video signal (that is, 5 clocks).

In FIG. 6, unlike in FIG. 5, the phase of the external frame synchronous signal (FRM_SYNC) is set later than that of the frame synchronous signal (FRM) of the digital video signal by 2 lines and 4 dots.

In the example shown in FIG. 6, the dot phase difference register (DOT PHASE REGISTER) holds the counter value "3", which indicates a phase difference of 4 dots. Further, the line phase difference register (LINE PHASE REGISTER) holds the counter value "2". The counter value held by the dot phase difference register does not indicate "4", so the counter value "2" held by the line phase difference register indicates a phase difference of 2 lines.

In the example shown in FIG. 6, the external frame timing signal (EXT_F) has a phase difference of 3 lines and 1 dot (a phase difference of 2 lines and 4 dots and a phase difference of 2 dots) from the pulse signal (FRM-SYNC-PS) of the external frame synchronous signal. The phase difference of 2 lines and 4 dots is observed between the pulse signal (FRM-SYNC-PS) of the external frame synchronous signal and the pulse signal (FRM-PS) of the frame synchronous signal of the digital video signal. The phase difference of 2 dots corresponds to a delay of 1 clock or dot caused by the comparator (LINE COMPARATOR) or the flip flop (F/F).

It is not always necessary that the external synchronous signal generating circuit comprises the means (12) and (13) for phase-shifting the external frame timing signal (EXT_F) and the external horizontal timing signal (EXT_H). If the external synchronous signal generating circuit does not comprise the means (12) or (13) for phase-shifting the external frame timing signal (EXT_F) and the external horizontal timing signal (EXT_H), the external frame timing signal (EXT_F) and the external horizontal timing signal (EXT_H) have a phase difference of 2 dots from the pulse signal (FRM_SYNC_PS) of the external frame synchronous signal, the phase difference being caused by a delay in the external synchronous signal generating circuit. In other words, the external frame timing signal (EXT_F) and external horizontal timing signal (EXT_H), outputted by the external synchronous signal generating circuit, are phase-synchronous with each other while maintaining a fixed phase difference from the pulse signal (FRM_SYNC_PS) of the external frame synchronous signal. Accordingly, those skilled in the art can appreciate that whether or not the external synchronous signal generating circuit comprises the means (12) and (13) for phase-shifting the external frame timing signal (EXT_F) and the external horizontal timing signal (EXT_H), each of the external frame timing signal (EXT_F) and external horizontal timing signal(EXT_H) is utilized as an external reference signal (an external frame synchronous signal or an external horizontal synchronous signal) in displaying the waveform of the digital video signal.(Characteristic of Present Invention)

A characteristic of the external synchronous signal generating circuit according to the present invention is that even if the frame frequency (frame period) of the external reference synchronous signal 24 (EXT_REF_SIGNAL) is different from the frame frequency (frame period) of the digital video signal 13, an external frame timing signal (EXT_F) can be generated. This is because the external synchronous signal generating circuit of the present invention generates an external frame synchronous signal from the external reference synchronous signal 24 again. The signal processing in Patent Document 1 or 2 generates only an external horizontal synchronous signal (trigger signal).

If the frame frequency (frame period) of the external reference synchronous signal 24 (EXT_REF_SIGNAL) is different from the frame frequency (frame period) of the digital video signal 13, the sync separator 31 extracts a 10-field reference number (a field ID) multiplexed in the external reference synchronous signal. The sync separator 31 then separates an external frame synchronous signal (FRM_SYNC) having only one predetermined field ID. The 10-field reference number is a field ID multiplexed in the external reference synchronous signal so as to enable the external frame synchronous signal (FRM_SYNC) to be separated using a period corresponding to the least common multiple of the period of the external frame synchronous signal (FRM_SYNC) and the period of the external reference synchronous signal (FRM) of the video signal 13. For example, if the digital video signal is an HD-SDI (format: for example, 1,080 psF/23.98 or 1,080 p/23.98) and the external reference synchronous signal is an NTSC (an NTSC in which the 10-field ID is multiplexed), the digital video signal has a frame frequency of 23.98 Hz, while the external reference synchronous signal has a frame frequency of 23.98 Hz. Consequently, a 5-frame period of the external reference synchronous signal is equal to a 4-frame period of the digital video signal. When the sync separator 31 separates the external frame synchronous signal (FRM_SYNC) having only one predetermined field ID (for example, field ID=1) from the external reference synchronous signal, only one of the 5 frames is outputted to the phase difference measuring circuit. In other words, the external frame synchronous signal (FRM_SYNC) is inputted to the phase difference measuring circuit using a period corresponding to the least common multiple of the period of the external frame synchronous signal (FRM_SYNC) and the period of the frame synchronous signal (FRM) of the video signal 13. Those skilled in the art can appreciate that each of the external frame timing signal and external horizontal timing signal, generated by the external frame synchronous signal (FRM_SYNC), is utilized as an external reference signal (an external frame synchronous signal or an external horizontal synchronous signal) in displaying the waveform of the digital video signal.

(Another Embodiment of Present Invention)

Figure 7:
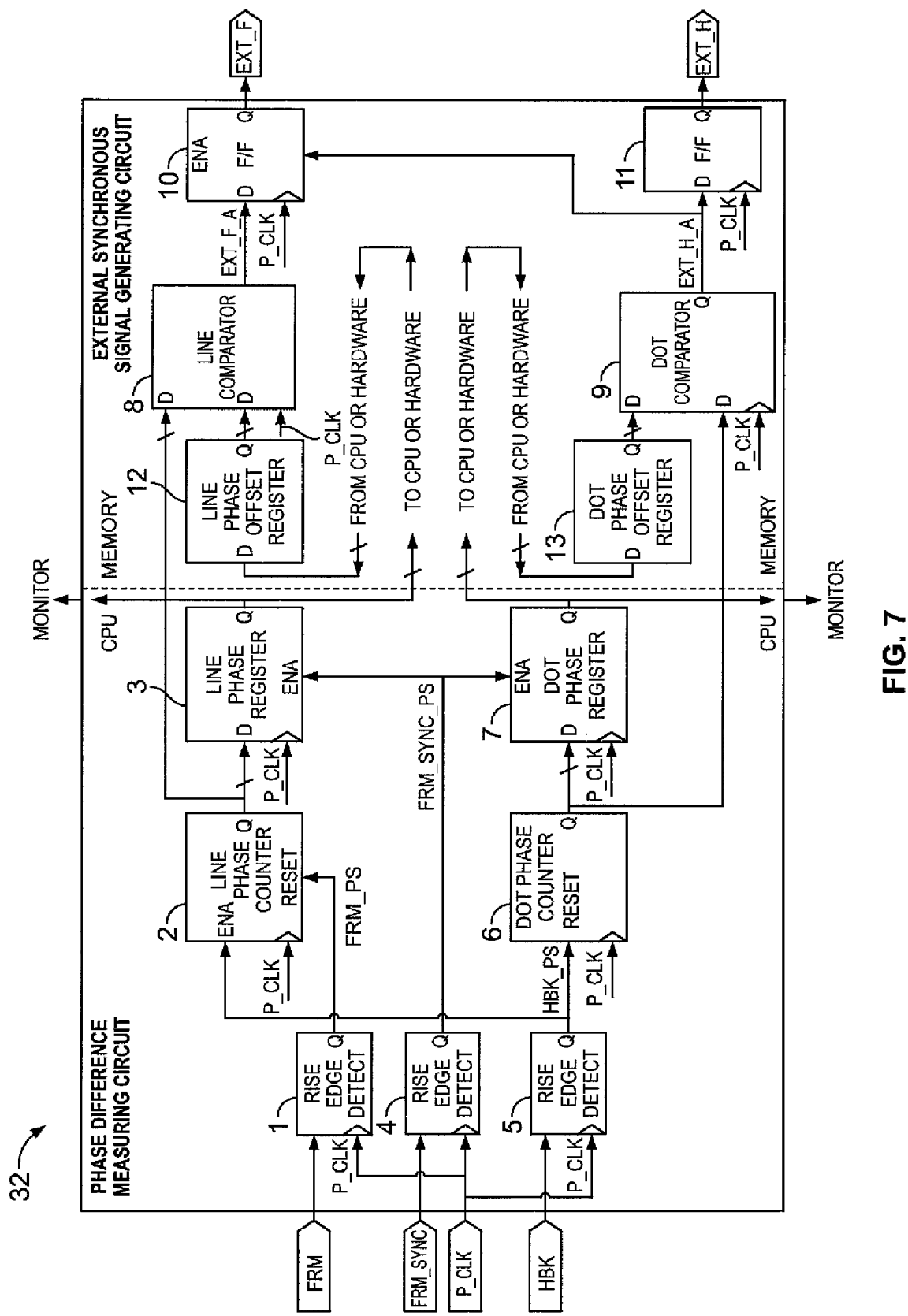
FIG. 7 is another example of a specific block diagram of the phase difference measuring circuit according to the present invention.

FIG. 7 shows another example of a specific block diagram of the phase difference measuring circuit of the present invention. Unlike the block diagram in FIG. 4, FIG. 7 shows the phase difference measuring circuit comprising a memory.

First, one (for example, 13a) of the digital video signals 13a and 13b is inputted to the waveform monitor as, for example, an Ach input. Then, since the phase difference measuring circuit comprises the means (6), (7), (2), and (3) for measuring the phase difference between the pulse signal (FRM_SYNC_PS) of the external frame synchronous signal and the pulse signal (FRM_PS) of the frame synchronous signal of the digital video signal 13a as described above, for example, the CPU stores the measured phase difference in the memory. Specifically, the counter values held by the dot phase difference register (7) and line phase difference register (3) are stored in the memory and displayed on the waveform monitor.

Then, the other (for example, 13b) of the digital video signals 13a and 13b is inputted to the waveform monitor as, for example, a Bch input. As described above, the phase difference between the pulse signal (FRM_SYNC_PS) of the external frame synchronous signal and the pulse signal (FRM_PS) of the frame synchronous signal of the digital video signal 13b is stored in the memory. Preferably, for example, the CPU calculates the relative difference between the phase difference of the Ach input and the phase difference of the Bch input. The CPU then stores the relative difference in the memory and the relative difference is displayed on the waveform monitor.

As such, the relative phase difference between the digital video signals 13a and 13b is displayed numerically (for example, the number of lines and dots), and it is possible to easily measure the relative phase difference. A phase adjuster can adjust the phase of the digital video signal 13a or 13b so that the numeral value which represents the relative phase difference goes to zero.

What is claimed is:

1. A circuit that generates an external synchronous signal, the circuit comprising:
    means for inputting an external frame synchronous signal (FRM_SYNC) as well as a frame synchronous signal (FRM) and a horizontal synchronous signal (HBK) of a digital video signal;
    means for measuring a phase difference between the external frame synchronous signal (FRM_SYNC) and the frame synchronous signal (FRM) of the digital video signal;
    means for generating a signal (EXT_H) having the same period as that of the horizontal synchronous signal (HBK) of the digital video signal, the signal (EXT_H) having the measured phase difference with reference to the frame synchronous signal (FRM) of the digital video; and
    means for generating a signal (EXT_F) having the same period as that of the frame synchronous signal (FRM) of the digital video signal, the signal (EXT_F) having the measured phase difference with reference to the frame synchronous signal (FRM) of the digital video,
    wherein the generated signals (EXT_F) and (EXT_H) are outputted as an external frame timing signal and an external horizontal timing signal of the external synchronous signal.

2. A circuit that generates an external synchronous signal, the circuit comprising:
    means (4) for generating a pulse signal (FRM_SYNC_PS) that is phase-synchronous with an external frame synchronous signal (FRM_SYNC);
    means (1) for generating a pulse signal (FRM_PS) that is phase-synchronous with a frame synchronous signal (FRM) of a digital video signal;

means (5) for generating a pulse signal (HBK_PS) that is phase-synchronous with a horizontal synchronous signal (HBK) of the digital video signal;

means (6, 7) for measuring a number of lines by which a phase of the pulse signal (FRM_SYNC_PS) of the external frame synchronous signal is separated from a phase of the pulse signal (FRM_PS) of the frame synchronous signal of the digital video signal in terms of a period of the horizontal synchronous signal (HBK) of the digital video signal;

means (2, 3) for measuring a number of dots by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal;

means (9) for generating a signal (EXT_H_A) that is phase-shifted with respect to the phase of the pulse signal (FRM_PS) of the frame synchronous signal of the digital video signal on the basis of the measured number of dots, the signal (EXT_H_A) having the same period as that of the horizontal synchronous signal (HBK) of the digital video signal;

means (8) for generating a signal (EXT_F_A) that is phase-shifted with respect to the phase of the pulse signal (FRM_PS) of the frame synchronous signal of the digital video signal on the basis of the measured number of lines, the signal (EXT_F_A) having the same period as that of the frame synchronous signal (FRM) of the digital video signal;

means (10) for phase-shifting the signal (EXT_F_A) generated by the means (8) on the basis of the measured number of dots; and means (11) for phase-shifting the signal (EXT_H_A) generated by the means (9) so that a phase of the signal (EXT_F) phase-shifted by the means (10) matches a phase of the signal (EXT_H_A) generated by the means (9), wherein the signal (EXT_F) phase-shifted by the means (10) and the signal (EXT_H) phase-shifted by the means (11) are outputted as an external frame timing signal and an external horizontal timing signal of the external synchronous signal.

3. A circuit that generates an external synchronous signal, the circuit comprising:

a circuit (4) that detects a rise in an external frame synchronous signal (FRM_SYNC), the circuit (4) generating a pulse signal (FRM_SYNC_PS) that is phase-synchronous with the external frame synchronous signal (FRM_SYNC);

a circuit (1) that detects a rise in a frame synchronous signal (FRM) of a digital video signal, the circuit (1) generating a pulse signal (FRM_PS) that is phase-synchronous with the frame synchronous signal (FRM) of the digital video signal;

a circuit (5) that detects a rise in a horizontal synchronous signal (HBK) of the digital video signal, the circuit (5) generating a pulse signal (HBK_PS) that is phase-synchronous with the horizontal synchronous signal (HBK) of the digital video signal;

a first counter (6) that counts a number of clocks of the digital video signal using the pulse signal (HBK_PS) of the horizontal synchronous signal of the digital video signal as a reset signal;

a first register (7) that inputs the pulse signal (FRM_SYNC_PS) of the external frame synchronous signal as an enable signal and that holds a counter value in the first counter when the pulse signal of the external frame synchronous signal is inputted;

a second counter (2) that counts a number of periods of the pulse signal (HBK_PS) of the horizontal synchronous signal of the digital video signal using the pulse signal (FRM_PS) of the frame synchronous signal of the digital video signal as a reset signal;

a second register (3) that input the pulse signal (FRM_SYNC_PS) of the external frame synchronous signal as an enable signal and that holds a counter value in the second counter when the pulse signal of the external frame synchronous signal is inputted;

a first comparator (9) that generates a signal (EXT_H_A) indicating a HIGH status only while the counter value counted by the first counter matches the counter value held by the first register;

a second comparator (8) that generates a signal (EXT_F_A) indicating a HIGH status only while the counter value counted by the second counter matches the counter value held by the second register;

a first flip flop (10) that latches the signal (EXT_F_A) from the second comparator (8) temporally in accordance with the signal (EXT_H_A) from the first comparator (9); and a second flip flop (11) that latches the signal (EXT_H_A) from the first comparator (9) temporally in accordance with the clock for the digital video signal;

wherein the signal (EXT_F) latched by the first flip flop (10) and the signal (EXT_H) latched by the second flip flop (11) are outputted as an external frame timing signal and an external horizontal timing signal of the external synchronous signal.

4. A circuit that measures a phase difference, the circuit comprising:

means (4) for generating a pulse signal (FRM_SYNC_PS) that is phase-synchronous with an external frame synchronous signal (FRM_SYNC);

means (1) for generating a pulse signal (FRM_PS) that is phase-synchronous with a frame synchronous signal (FRM) of a digital video signal;

means (5) for generating a pulse signal (HBK_PS) that is phase-synchronous with a horizontal synchronous signal (HBK) of the digital video signal;

means (6, 7) for measuring a number of lines by which a phase of the pulse signal (FRM_SYNC_PS) of the external frame synchronous signal is separated from a phase of the pulse signal (FRM_PS) of the frame synchronous signal of the digital video signal in terms of a period of the horizontal synchronous signal (HBK) of the digital video signal; and means (2, 3) for measuring a number of dots by which the phase of the pulse signal (FRM_SYNC_PS) of the external frame synchronous signal is separated from the phase of the pulse signal (FRM_PS) of the frame synchronous signal of the digital video signal in terms of the period of the horizontal synchronous signal (HBK) of the digital video signal.

5. A waveform monitor comprising the circuit that measures a phase difference according to claim 4, the waveform monitor further comprising:

memory means for storing the measured number of lines and the measured number of dots, wherein the measured number of lines and the measured number of dots are displayed on the waveform monitor.

6. The waveform monitor according to claim 5, further comprising:

a CPU that calculates a difference between the number of lines and the number of dots of a digital video signal inputted as a first input and the number of lines and the number of dots of another digital video signal inputted as a second input, wherein the calculated difference is displayed on the waveform monitor as a relative phase difference between the digital video signal as the first input and the digital video signal as the second input.

7. A circuit that measures a phase difference, the circuit comprising:

- a circuit (4) that detects a rise in an external frame synchronous signal (FRM_SYNC), the circuit (4) generating a pulse signal (FRM_SYNC_PS) that is phase-synchronous with the external frame synchronous signal (FRM_SYNC);
- a circuit (1) that detects a rise in a frame synchronous signal (FRM) of a digital video signal, the circuit (1) generating a pulse signal (FRM_PS) that is phase-synchronous with the frame synchronous signal (FRM) of the digital video signal;
- a circuit (5) that detects a rise in a horizontal synchronous signal (HBK) of the digital video signal, the circuit (5) generating a pulse signal (HBK_PS) that is phase-synchronous with the horizontal synchronous signal (HBK) of the digital video signal;
- a dot phase difference counter (6) that counts a number of clocks of the digital video signal using the pulse signal (HBK_PS) of the horizontal synchronous signal of the digital video signal as a reset signal;
- a dot phase difference register (7) that inputs the pulse signal (FRM_SYNC_PS) of the external frame synchronous signal as an enable signal and that holds a counter value in the dot phase difference counter when the pulse signal of the external frame synchronous signal is inputted;
- a line phase difference counter (2) that counts a number of periods of the pulse signal (HBK_PS) of the horizontal synchronous signal of the digital video signal using the pulse signal (FMR_PS) of the frame synchronous signal of the digital video signal as a reset signal; and
- a line phase difference register (3) that inputs the pulse signal (FRM_SYNC_PS) of the external frame synchronous signal as an enable signal and that holds a counter value in the line phase difference counter when the pulse signal of the external frame synchronous signal is inputted.

* * * * *